United States Patent [19]
Hansen et al.

[11] Patent Number: 5,953,241
[45] Date of Patent: Sep. 14, 1999

[54] MULTIPLIER ARRAY PROCESSING SYSTEM WITH ENHANCED UTILIZATION AT LOWER PRECISION FOR GROUP MULTIPLY AND SUM INSTRUCTION

[75] Inventors: Craig C. Hansen, Los Altos; Henry Massalin, Sunnyvale, both of Calif.

[73] Assignee: Microunity Engeering Systems, Inc., Sunnyvale, Calif.

[21] Appl. No.: 08/857,596

[22] Filed: May 16, 1997

Related U.S. Application Data

[63] Continuation-in-part of application No. 08/516,036, Aug. 16, 1995, Pat. No. 5,742,840.
[60] Provisional application No. 60/021,132, May 17, 1996.
[51] Int. Cl.[6] ............................... G06F 7/48; G06F 7/52
[52] U.S. Cl. ............................... 364/748.07; 364/736.02; 364/757; 364/758; 364/760.03; 364/750.5; 364/724.16; 395/800.09; 395/800.35
[58] Field of Search ............................... 364/736.02, 748, 364/757, 758, 760.01, 760.02, 760.03, 760.04, 760.05, 750.5, 724.16, 748.07; 395/800.35, 800.09

[56] References Cited

U.S. PATENT DOCUMENTS

| | | | |
|---|---|---|---|
| 4,876,660 | 10/1989 | Owen et al. | 364/750.5 |
| 4,956,801 | 9/1990 | Priem et al. | 364/748.07 |
| 4,969,118 | 11/1990 | Montoye et al. | 364/748.07 |
| 5,032,865 | 7/1991 | Schlunt | 364/750.5 |
| 5,408,581 | 4/1995 | Suzuki et al. | 364/724.16 |
| 5,500,811 | 3/1996 | Corry | 364/724.16 |

*Primary Examiner*—Mark R. Powell
*Assistant Examiner*—Jeffrey Allen Rossi
*Attorney, Agent, or Firm*—McDermott, Will & Emery

[57] ABSTRACT

A multiplier array processing system which improves the utilization of the multiplier and adder array for lower-precision arithmetic is described. New instructions are defined which provide for the deployment of additional multiply and add operations as a result of a single instruction, and for the deployment of greater multiply and add operands as the symbol size is decreased.

7 Claims, 13 Drawing Sheets

Figure 2 — Group Fixed-point Multiply and Add

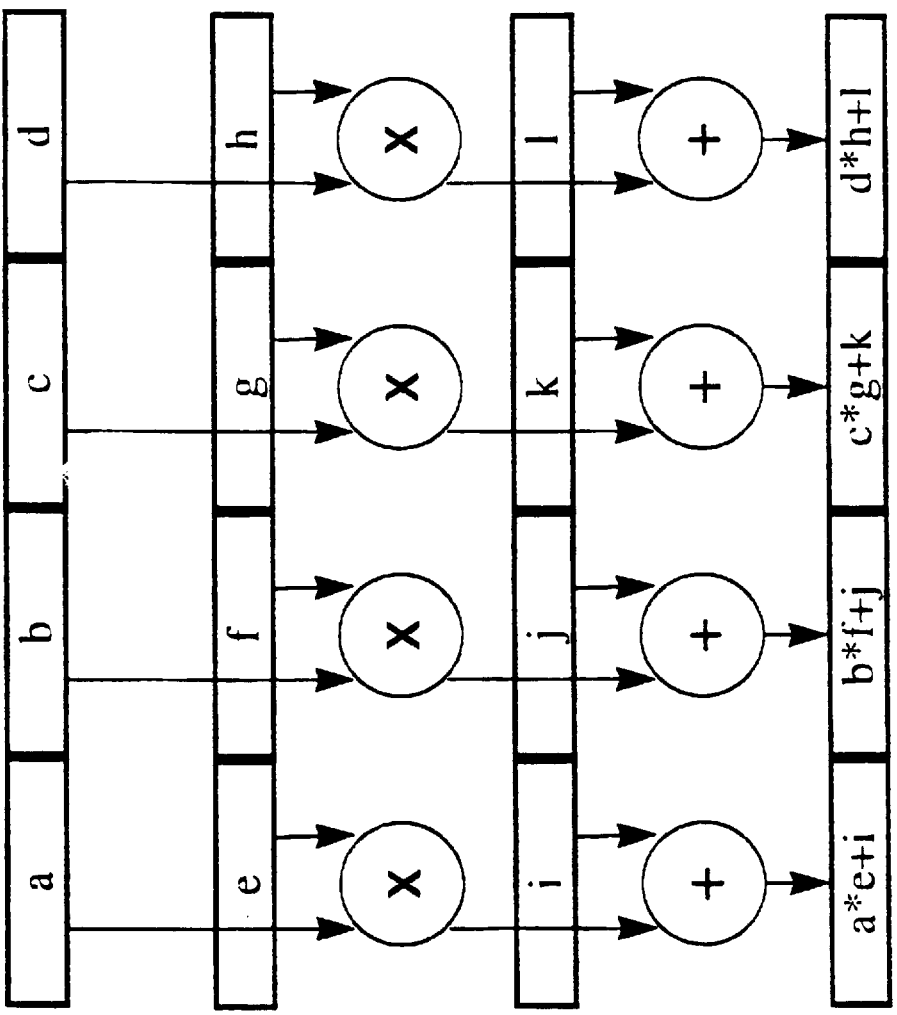
Figure 4  Group Floating-point Multiply and Add

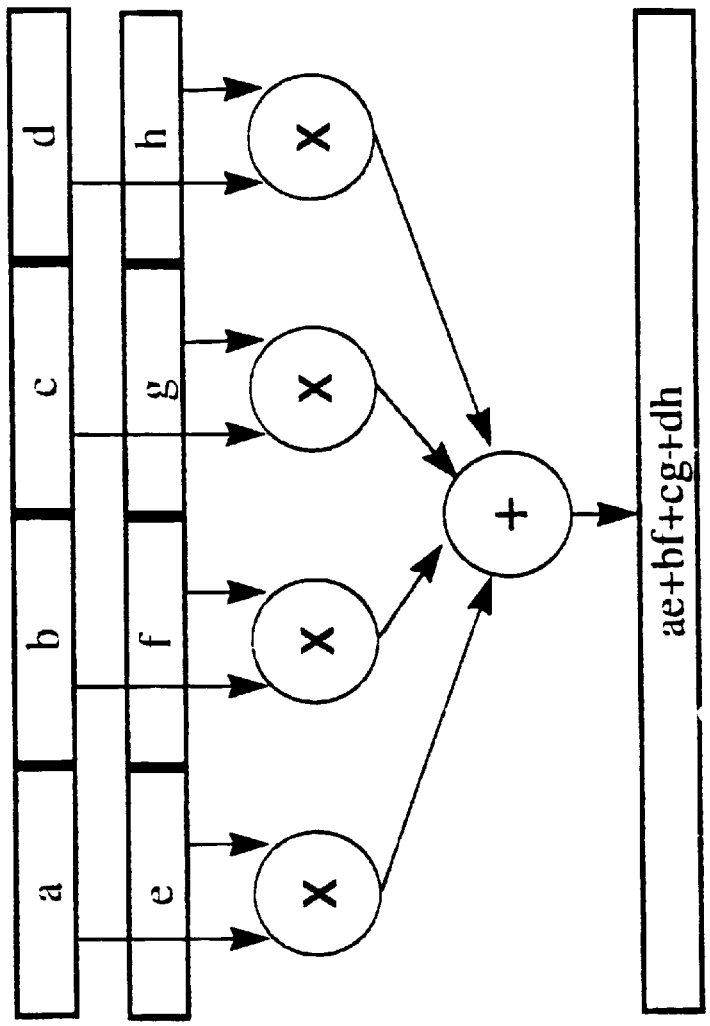

Group Floating-point Multiply and Sum

- Group Multiply and Sum: 64/128 bits := 128*128 bits
- symbol sizes of 16, 32, 64 bits

- Group Convolve: 128 bits := 64 * 64 bits
- symbol sizes of 1, 2, 4, 8, 16, 32 bits

Group Fixed-point Convolve

- Group Convolve: 128 bits := 128 * 64 bits
- sizes of 1, 2, 4, 8, 16, 32 bits
- signed and unsigned Group fixed-point convolve

- Group Convolve: 128 bits := 128 * 64 bits
- symbol size of 16 bits shown

Group Floating-point convolve

- Group Convolve: 64 bits := 128 * 64 bits
- sizes of 16, 32 bits

MULTIPLIER ARRAY PROCESSING SYSTEM WITH ENHANCED UTILIZATION AT LOWER PRECISION FOR GROUP MULTIPLY AND SUM INSTRUCTION

RELATED APPLICATIONS

This is a continuation of Provisional Application Ser. No. 60/021,132, filed on May 17, 1996, entitled MULTIPLIER ARRAY PROCESSING SYSTEM WITH ENHANCED UTILIZATION AT LOWER PRECISION, which is a continuation-in-part of U.S. patent application Ser. No. 08/516,036 filed Aug. 16, 1995 now U.S. Pat. No. 5,742,840, issued Apr. 21, 1998, entitled "General Purpose, Multiple Precision Parallel Operation, Programmable Media Processor".

FIELD OF THE INVENTION

The present invention relates to an instruction set and data paths of processors which perform fixed-point and floating-point multiply and add operations, and particularly processors which perform both multiply and add operations as a result of a single instruction.

BACKGROUND OF THE INVENTION

A general-purpose processing system which performs multiply and add operations may allow these arithmetic operations to be performed at varying precision. High-precision operations generally consume greater circuit resources than low-precision operations. For example, in order to double the precision of a multiply operation, about four times as many circuits are required if the same performance is to be achieved.

A multiplier array which is capable of performing a multiply of two 64-bit operands, without reusing the array in sequential fashion, must generate the equivalent of $64^2$, or 4096 bits of binary product (a 1-bit multiply is the same as a boolean or binary "and" operation), and reduce the product bits in an array of binary adders which produces 128 bits of result. As a single binary adder (a full adder) takes in three inputs and produces two outputs, the number of binary adders required for such an array can be computed $64^2-128$, or 3968.

There are well-known techniques for reducing the number of product bits, such as Booth encoding. There are also well-known techniques for performing the required add operations so as to minimize delay, such as the use of arrays of carry-save-adders. These techniques can reduce the size of multiplier arrays and reduce the delay of addition arrays, however, these techniques do not appreciably change the relation between the size of the operand and the size of the multiplier and adder arrays.

Using the same arithmetic as before, a multiply of 32-bit operands generates the equivalent of $32^2$, or 1024 bits of binary product, and uses the $32^2-64$, or 960 full adders to generate a 64-bit product. This clearly is approximately one fourth the resources required for a multiply of 64-bit operands.

Because the product of 32-bit operands is 64-bits, while the product of 64-bit operands is 128-bits, one can perform two 32-bit multiples which produce 2 64-bit products, giving a 128-bit result. As such, because the 32-bit product uses one-fourth the resources of the 64-bit product, these two 32-bit products use one-half the resources of the 64-bit product. Continuing this computation, four 16-bit products use one-quarter of the 64-bit multiplier resources, eight 8-bit products use one-eighth of the resources, and so forth.

Thus, while this technique produces results with the same number of bits as the 64-bit product, decreasing the symbol size results in a proportionately decreasing utilization of the multiplier and adder array resources. Clearly, a design that has sufficient resources for a 64-bit multiply will be underutilized for multiplies on smaller symbols.

Accordingly, there exits a need for a method, instruction set and system in which a set of multiplier and adder circuit resources may be employed in a manner that increases the utilization of these resources for performing several multiply and add operations at once as a result of executing an instruction, and which also permits the expansion of the multiplier and adder circuit resources to an even higher level so as to further increase overall performance.

SUMMARY OF THE INVENTION

The present invention relates to a method, instruction, and system which improves the utilization of a multiplier and adder array for performing multiply and add operations at a lower precision than the full word size of the processor and particularly the multiplier and adder array.

In accordance with an exemplary embodiment of the present invention, a novel group-multiply-and-sum instruction is performed wherein operands which are the word size of the processor, for example, 128-bits, are divided into symbols where the symbols are 64, 32, 16, 8, 4, 2, or 1 bit. Multiplier and multiplicand symbols are then multiplied together, and the products are added together so as to produce a single scalar result. The instruction performs twice as many multiplies as a group-multiply-and-add instruction (as described in related U.S. patent application Ser. No. 08/516,036, hereinafter referred to as the parent application) of the same symbol size. The instruction also avoids fixed-point overflows, because in the current example, the 128-bit result is large enough to hold the sum.

In another embodiment of the present invention, a novel group multiply-and-sum-and-add instruction is performed, wherein two operands are divided into symbols and then multiplied together. All the products resulting therefrom are then added together, along with a third operand value so as to produce a single scalar result. The instruction performs twice as many multiplies as a group-multiply-and-add instruction (as described in the parent application) of the same symbol size.

In another embodiment of the present invention, a novel group-complex-multiply instruction is performed, wherein the 64-bit multiplier and multiplicand operands are divided into symbols. Alternate symbols are taken to represent real parts (a and c) and imaginary parts (b and d) of a complex value, and a computation $(a+bi)*(c+di)=(ac-bd)+(bc+ad)i$ is performed. The instruction performs twice as many multiples as a group-multiply instruction (as described in the parent application) of the same symbol size, and in the current embodiment generates a result which is a 128-bit value.

In another embodiment of the present invention, a novel group-complex-multiply-and-add is performed, wherein two 64-bit operands are divided into complex-valued symbols, and a third 128-bit operand is divided into complex-valued symbols of twice the symbol size. The computation $(a+bi)*(c+di)+(e+fi)=(ac-bd+e)+(bc+ad+f)i$ is performed. The result is a 128-bit value.

In yet another embodiment of the present invention, a novel group-convolve instruction is performed, wherein all but one symbol of a 128-bit value is multiplied with symbols of a 64-bit value. Certain of these products are summed together to form a 64-bit-by-64-bit slice of a convolution. The result is a 128-bit value.

As described in detail below, the present invention provides important advantages over the prior art. Most importantly, the present invention optimizes both system performance and overall power efficiency. The present invention performs a greater number of multiply operations and add operations in a single instruction without increasing the size of the result of this single instruction. The present invention arranges these operations in a manner which is advantageous both for implementation of digital signal processing algorithms, as the instructions perform these operations with greater parallelism and greater avoidance of arithmetic overflow, and which is advantageous for implementation of the multiplier itself, as these multipliers are formed from a partitioning of a single multiplier array, thereby overcoming significant disadvantages suffered by prior art devices as detailed above.

Additional advantages of the present invention will become apparent to those skilled in the art from the following detailed description of exemplary embodiments, which exemplify the best mode of carrying out the invention.

The invention itself, together with further objects and advantages, can be better understood by reference to the following detailed description and the accompanying drawings.

BRIEF DESCRIPTION OF THE DRAWINGS

FIG. 4 illustrates a group floating-point multiply and add instruction, as described in the parent application.

DETAILED DESCRIPTION

A multiplier array processing system is described wherein numerous specific details are set forth, such as word size, data path size, and instruction formats etc., in order to provide a thorough understanding of the present invention. It will be obvious, however, to one skilled in the art that these specific details need not be employed to practice the present invention. In other instances, well known processor control path and data path structures have not been described in detail in order to avoid unnecessarily obscuring the present invention.

FIGS. 1–4 illustrate instructions from the instruction set forth in the parent application, Ser. No. 08/516,036 filed Aug. 16, 1995.

Figure 1:
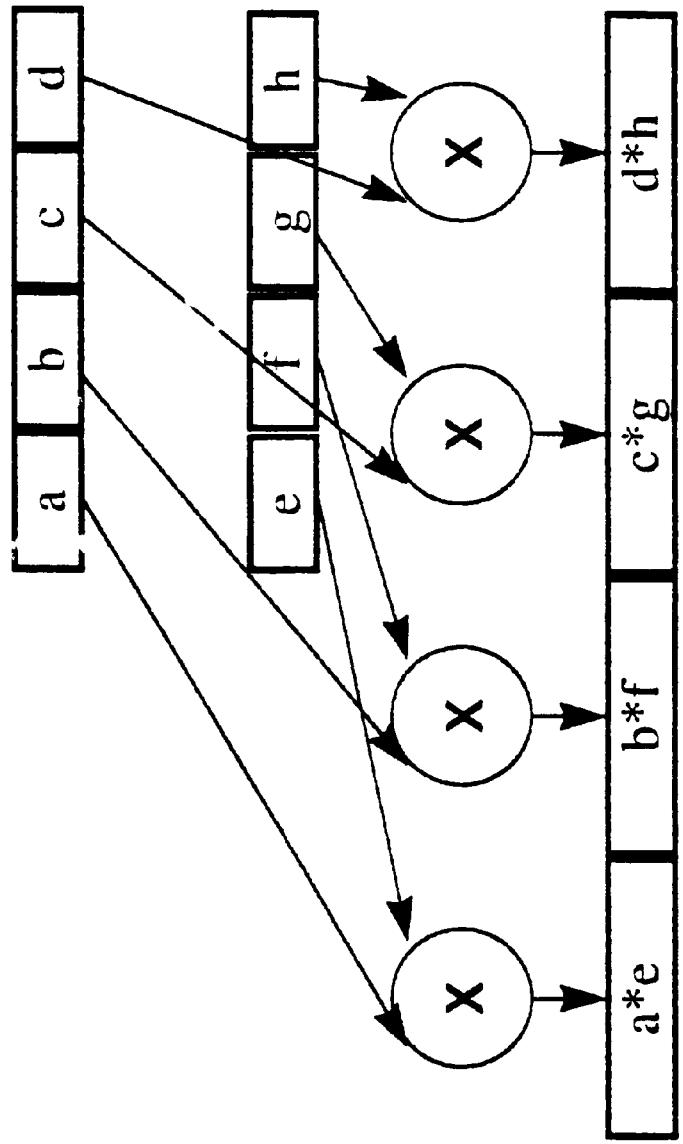
FIG. 1 illustrates a group fixed-point multiply instruction, as described in the parent application.
Figure 2:
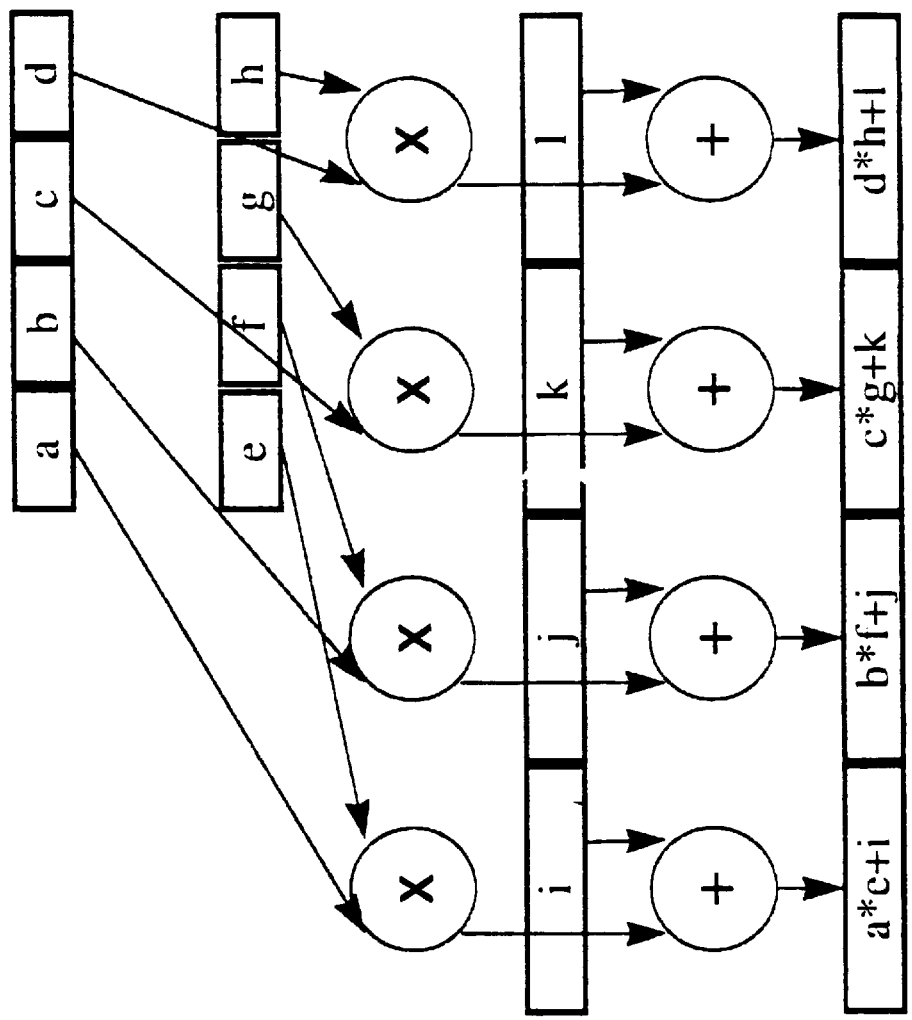
FIG. 2 illustrates a group fixed-point multiply and add instruction, as described in the parent application.

FIGS. 1 and 2 relate to fixed-point multiplication instructions, wherein groups of symbols of 64-bit total size are multiplied together, thereby producing groups of products of 128-bit total size. The individual symbols are of sizes from 1 bit to 64 bits, i.e., 64×1-bit, 32×2-bit, 16×4-bit, 8×8-bit, 4×16-bit, 2×32-bit or 1×64-bit. The products of the multiplication are twice the size of the input symbols, which reflects the size the result must be to avoid fixed-point overflow in the computation of the product.

One measure of the complexity of the instruction is the size of the result. It is preferable to limit the size of the result to 128 bits for each of the instructions, as this reduces the number and width of write ports to register files and the number of gates required to bypass results around the register file.

FIG. 2 illustrates a fixed-point multiply-and-add instruction, in which the product is added to a third value on a symbol-by-symbol basis. The instruction performs twice as many operations per instruction as the instruction shown in FIG. 1, as it performs an add operation for each multiply operation.

Figure 3:
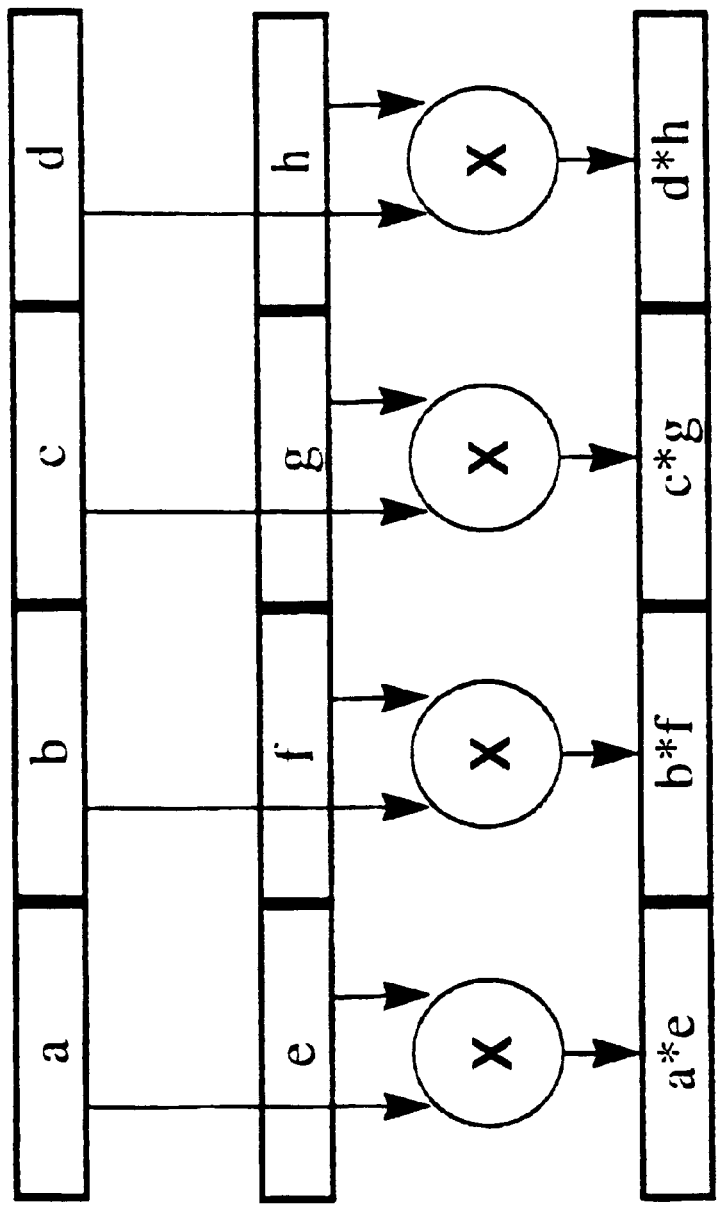
FIG. 3 illustrates a group floating-point multiply instruction, as described in the parent application.

FIGS. 3 and 4 illustrate the same operations, as illustrated in FIGS. 1 and 2, respectively, when floating-point operations are specified. In this case, as the size of the product is the same as the size of the input symbol (in this example—128 bits), 128 bits of source operand is allowed. Thus, for equal size of symbols, the floating-point instructions of FIGS. 3–4 perform twice as many operations as the fixed-point instructions of FIGS. 1–2.

There are many applications for the multiply and multiply-and-add instructions of FIGS. 1–4. One application, which is typical of a class of applications, is called FIR (Finite Impulse Response) filters. FIR filters are particularly easy to implement using the multiply-and-add instructions because adjacent results are independent, meaning that they can be computed separately and therefore in parallel. The group multiply-and-add instruction performs the computation for several adjacent results in parallel.

However, one problem that arises with the instruction shown in, for example, FIG. 2, is that the addition operations can suffer overflow, because the result symbols are the same size as the add source operand. This is generally avoided by scaling the values of the symbols so as to avoid overflow (i.e., making the multiplier operand smaller), so that the products which are added together are not larger than can be represented in the result symbol. This scaling results in a limit on the accuracy of the computation, as the multiplier generally has a value which must be rounded off to scale to the required precision.

Accordingly, in order to overcome this limitation, it is a goal of the present invention to provide instructions which perform a greater number of multiplies in a single operation, without increasing the size of the result to be greater than the size of an operand, which in the current example is 128 bits.

Figure 5:
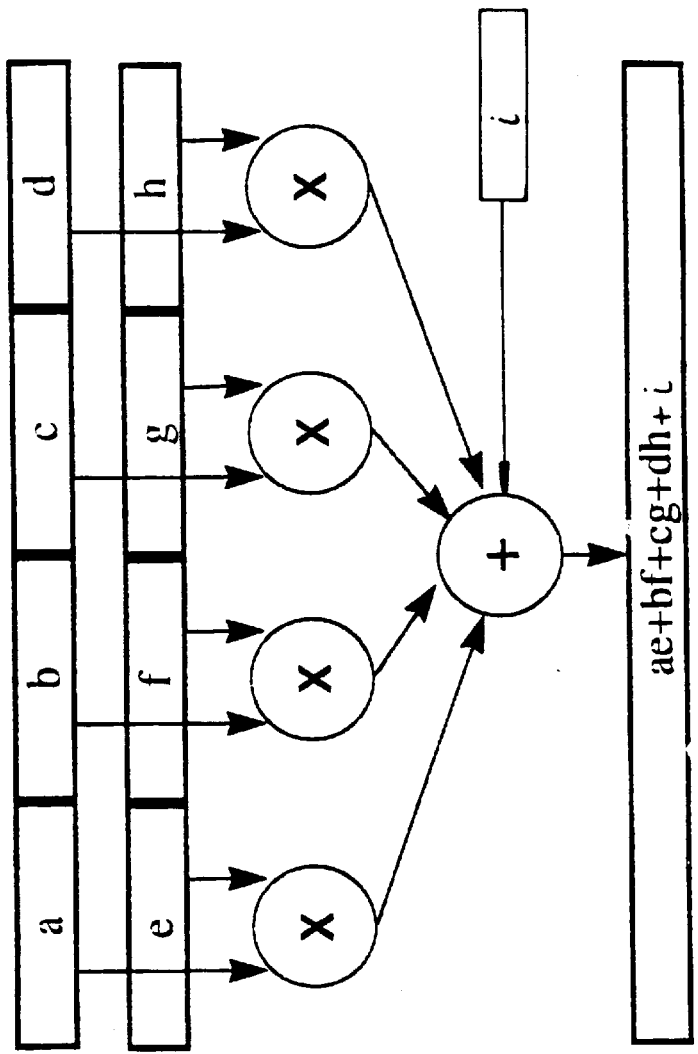
FIGS. 5A and 5B illustrate group fixed-point multiply and sum instructions of the present invention.

FIG. 5A illustrates a novel instruction which satisfies this goal. In accordance with the instruction, which is referred to as a group-fixed-point-multiply-and-sum, two 128-bit operands are divided into groups of bits, forming equal-sized symbols which may have sizes of 1, 2, 4, 8, 16, 32 and 64 bits. The groups of symbols are multiplied together to form a plurality of products, each of which are of twice the size as the operands, and then the products added together. The addition of all the products together reduces the size of the result such that the result size does not exceed 128 bits. Specifically, a 1-bit multiply-and-sum produces 128 1-bit products, which can be represented in as little as 8 bits, since the largest sum is 128; a 2-bit multiply-and-sum produces 64 4-bit products, each valued 0,1,4, or 9, for which the largest unsigned sum is 576, and the largest signed sum is 64*(−2 to +4) =−128 to 256, which can be represented in as little as 9 bits. In general, an n-bit multiply-and-sum produces 128/n 2n-bit products, which can be represented in $\log_2(128/n)+2n$ bits. For 64-bit symbols the products require 128 bits, and the sum of the two products would require 129 bits; the result is truncated in the same manner that the multiply-and-add operations must truncate the sum of the product with the addend, specifically, by truncating the high-order bit. As such, the group-fixed-point-multiply-and-sum instruction of FIG. 5A can accept two 128 bit groups as operands. Whereas, the group-fixed-point multiply-and-add instruction can accept only two 64-bit groups due to the limit of the total result size of 128 bits.

In fact, for all sizes of symbols from 1–16 bits, the result is no larger than 64-bits, which in some architecture designs is the width of a single register. For symbols of 32 bits, the 4 products are 64 bits each, so a 128-bit result is used, which cannot overflow on the sum operation. For symbols of 64 bits, the 2 products are 128 bits each and nearly all values can be added without overflow. The fact that this instruction takes 128-bit groups rather than 64-bit group means that twice as many multiplies are performed by this instruction, as compared to the instructions illustrated in FIGS. 1 and 2.

More specifically, referring to FIG. 5A, this instruction takes two 128-bit operands specified by ra and rb and multiplies the corresponding groups of the specified size, producing a series of results of twice the specified size. These results are then added together, after sign or zero extending as appropriate, producing a scalar result.

The size of the scalar result is 64 bits when the element size is 16 bits or smaller, and 128 bits when the element size is 32 -bits or larger. For 64 -bit elements, only two products are summed together, but as the result is only 128 bits, an overflow is still possible (for group signed multiply octlets and sum, the only case that overflows is when all elements equal $-2^{63}$), and an overflow causes truncation on the left and no exception. For element sizes 32-bits or smaller, no overflow can occur.

In summary, the group multiply-and-sum instruction does not result in a reduction of precision, and as a result, provides for greater precision and computation. In addition, the instruction multiplies twice as many operands as the group multiply and add instruction of the parent application, as only a scalar result is required, so that 128-bit result limitation (in the foregoing example) does not restrict the number of operands of the instruction. The 64-bit version of this instruction uses two 64×64 multiplier arrays, and smaller versions uses one-half of the arrays for each halving of operand size.

A related instruction, group-fixed-point-multiply-and-sum-and-add, is illustrated in FIG. 5B. As shown, this instruction takes the two 128-bit multiplier and multiplicand operands and divides each operand into groups, multiplies the groups thereby generating a plurality of products, and then sums the plurality of products with a third source operand. The third source operand is labelled "i", and it flows into the summation node. The result of the instruction is ae+bf+cg+dh+i.

Because the 1–16 bit versions of these multiply-and-sum-and-add instructions perform the additions with 64-bit precision, many instances of this instruction may be used repeatedly before the concern about overflow of the addition operations becomes a problem. Specifically, because the sum of the products requires at most 9 bits for the 1-bit version, 10 bits for the 2-bit version, 13 bits for the 4-bit version, 20 bits for the 8-bit version, and 35 bits for the 16-bit version, there are (64−9)=55 to (64−35)=29 additional bits for which the third source operand may repeatedly grow as further products are accumulated into a single register by repetitive use of the multiply-and-sum-and-add instruction. Thus from $2^{55}$ to $2^{29}$ multiply-and-sum-and-add instructions may be performed to a single register without concern of overflow. Thus, the instructions of the present invention permit the multiplier operand to be scaled to use the full precision of the multiplier symbols, which improves the accuracy of computations which use this instruction rather than the multiply-and-add instructions.

The multiply-and-sum and multiply-and-sum-and-add instructions of the present invention are particularly useful for implementing IIR filters (Infinite Impulse Response) filters, in which each output sample is a weighted sum of several previous output values. In such a case, the value of each output sample is dependent on the value computed for each previous output value, so the parallelism available in a FIR filter is not available in the IIR filter. Parallelism of a different form, however, can be used, in that several multiplies of weights (multipliers) with several previous output values can be performed at once, and the summing node itself can be implemented with a great deal of parallelism.

Figure 6:
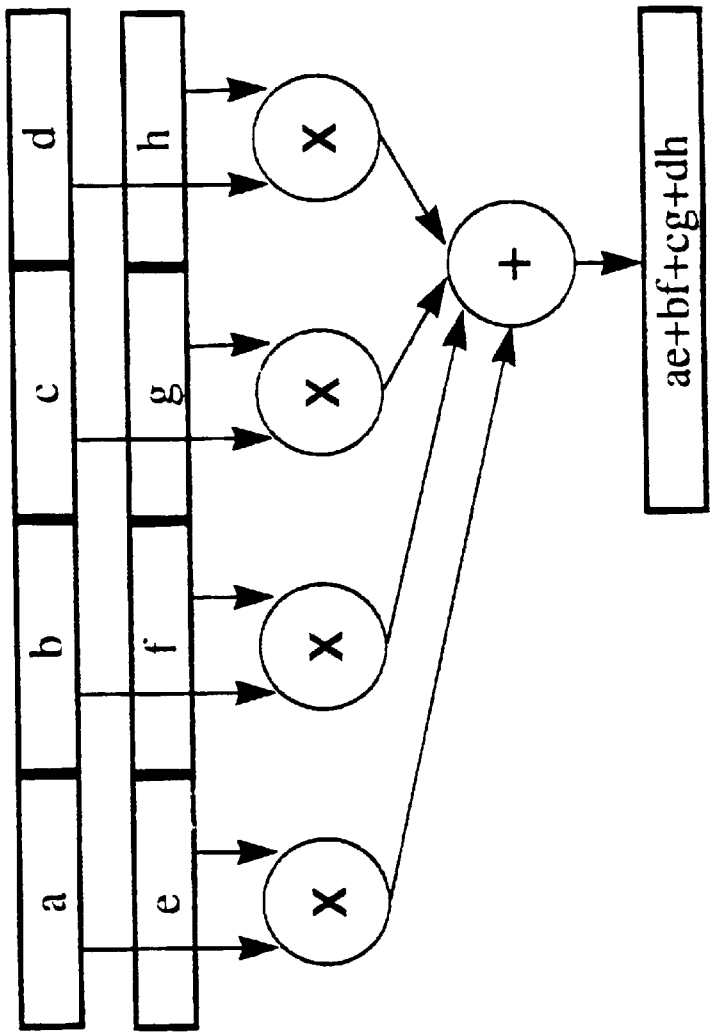
FIG. 6 illustrates a group floating-point multiply and sum instruction of the present invention.

FIG. 6 illustrates a novel group-floating-point-multiply-and-sum instruction. This instruction is useful because the sum operation can be carried out with greater precision than that of the result, when the precision is sufficiently small that more than two products are added together. This greater precision allows a more accurate result to be computed, as there is less rounding of the add result, particularly if the exponent values differ significantly for each of the products. The result does not need to be rounded until the complete sum has been computed.

Figure 7:
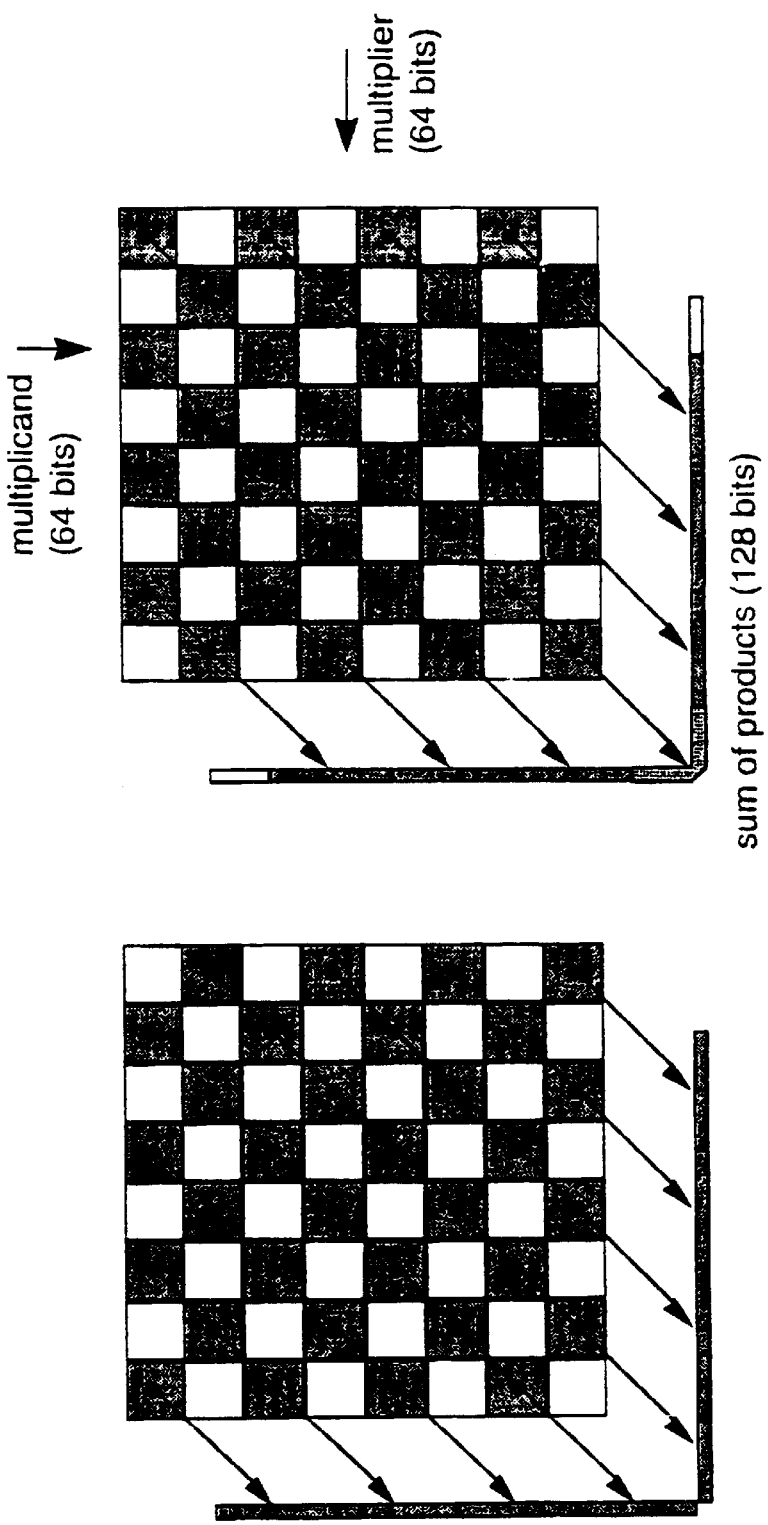
FIG. 7 illustrates one embodiment of a group fixed-point or floating-point convolve instruction of the present invention.

FIG. 7 illustrates one embodiment of a group fixed-point or floating-point convolve instruction of the present invention. There are two subtypes of this instruction, each of which use one-half of a fixed-point multiplier array. The shaded values indicate the location of products which are formed by multiplying multiplicand symbols directed from the top of the array with multiplier symbols directed from the right side of the array. Each of the indicated products connected with a dotted line are added together, yielding sums of products as the result. Each of the unshaded locations in the array are configured to generate zero values into the multipliers product accumulation array. For the fixed-point convolve instruction, the size of the result symbols are twice the size of the multiplier and multiplicand symbols. For a floating-point convolve instruction, the size of the result symbols are the same as the size of the multiplier and multiplicand symbols. As each of the subtypes use one-half of the array, it is apparent that halving the symbol size quadruples the number of multiplies.

Figure 8:
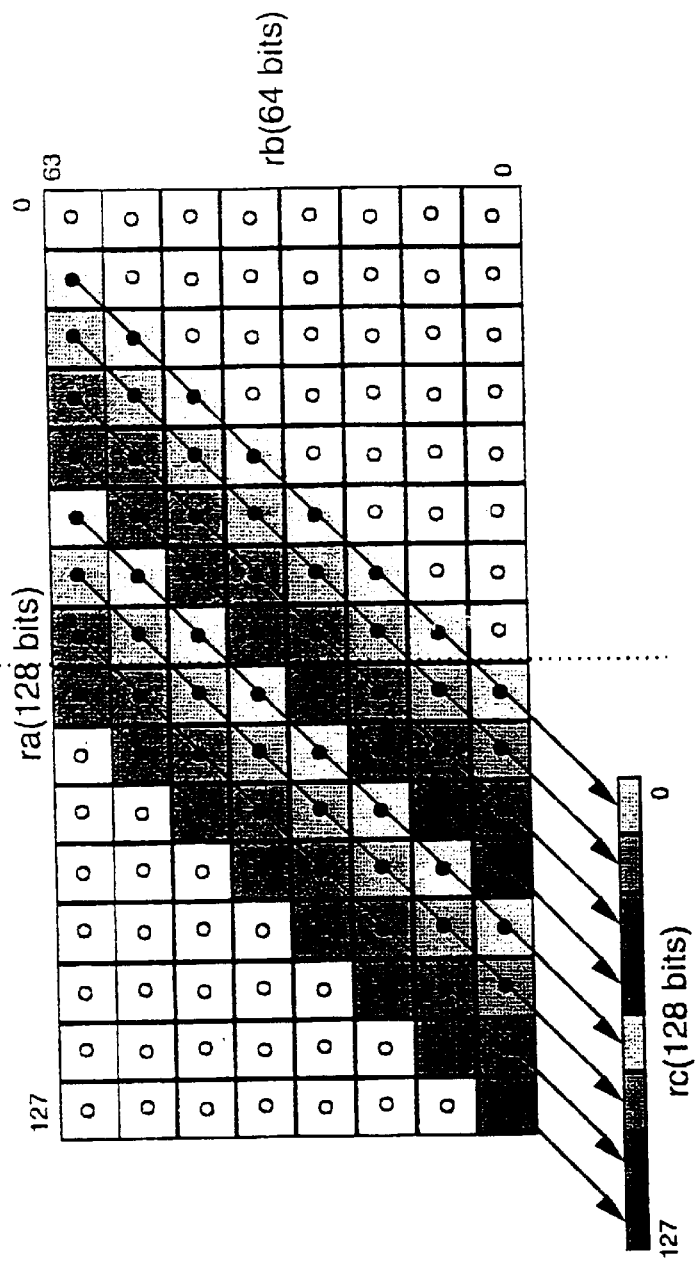
FIG. 8 illustrates a second embodiment of a group fixed-point convolve instruction of the present invention.
Figure 9:
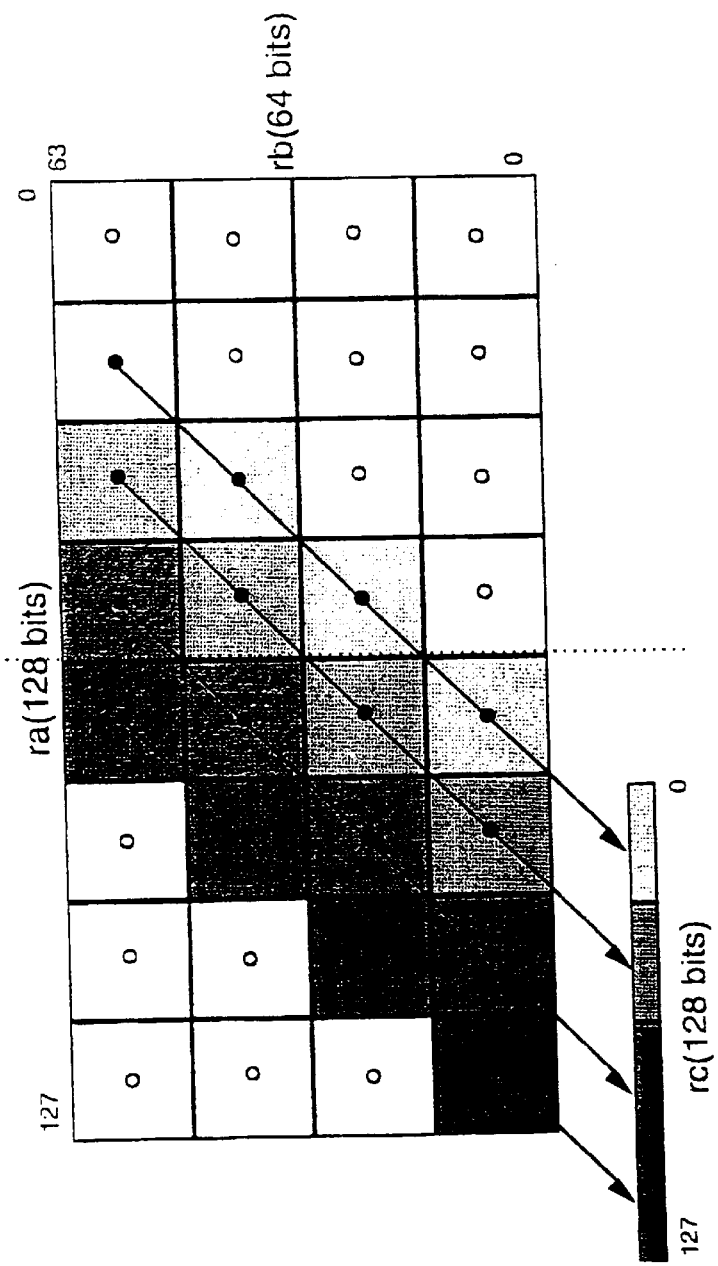
FIG. 9 illustrates an embodiment of a group 16-bit fixed-point convolve instruction of the present invention.

FIG. 8 illustrates a second embodiment of a group fixed-point convolve instruction of the present invention. In accordance with the second embodiment, a 128-bit group of symbols (ra) is multiplied with a 64-bit group of symbols (rb) in the pattern shown, and the resulting products, shown as small black circles, are added together in the pattern shown by the connecting lines, producing a 128-bit group of result symbols (rc) (of twice the size as the operand symbols, as the fixed-point products are twice the size of the multiplier and multiplicand symbols). The instruction illustrated in FIG. 8 is an 8-bit version; a 16-bit version is illustrated in FIG. 9, as the 16-bit version takes 16-bit operand symbols (ra) and (rb), and produces 32-bit result symbols (rc). As in FIG. 7, the products in FIGS. 8 and 9 are formed by multiplying together operands at the locations indicated by the black dots, where the multiplicand operand is directed from above the array, and the multiplier operand is directed from the right of the array.

Figure 10:
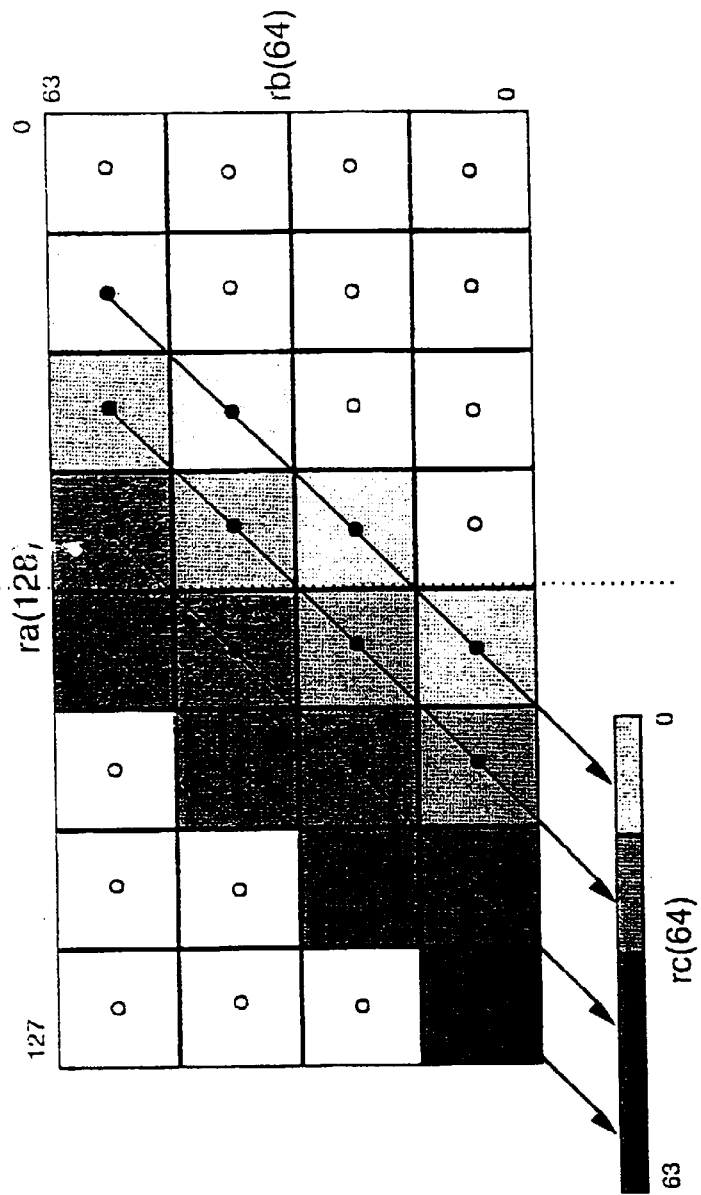
FIG. 10 illustrates a second embodiment of a group floating-point convolve instruction of the present invention.

FIG. 10 illustrates a group-floating-point-convolve, which is the same as the fixed-point convolve in structure, except that the result symbols (rc) are the same size as the operand symbols (ra) and (rb). Thus, the result of this floating-point instruction need be only 64 bits, as the floating-point product symbols are rounded to become the same size in bits as the operand symbols. An extension of this instruction can be made into one that performs four times as many multiplies, as the result size shown here is 64 bits, half of the maximum 128-bit result size limit. Such an extension would have 256 bits of operand ra and 128 bits of operand rb.

In accordance with the foregoing group convolve instructions of the present invention, the efficiency of use of the multiplier array does not decrease with decreasing operand size. In fact, the instruction provides a quadrupling of the number of effective operands each time the operand size is halved.

Referring again to FIG. 8, the group convolve instruction takes a 128-bit operand specified by ra and a 64-bit operand specified by rb, and treating the operands as ordered vectors, performs a convolution on the two vectors, truncating the computation so as to produce a 128-bit result. The result is an ordered vector of twice the specified precision. Overflow may possibly result from the summation of the products.

The group convolve instruction is designed to utilize the summation-tree of the multiplier array in a close approximation to the manner required for a scalar multiply. For this reason the ra operand is specified as 128 bits and the low-order element of the operand is not used. The rb operand uses 64-bit in the particular order required to enable the use of the existing summation tree. The result is 128-bit for fixed-point convolve and 64-bit for floating-point convolve.

As shown in FIG. 8, the result is essentially formed from portions if the multiplier array that are normally added together when performing a 64×64 multiply, although portions of the addition tree must be separated into two parts, and the result either uses both 64×64, multiplier arrays, or uses a single array which can be partitioned to multiply different operands in the upper-left triangular and lower-right triangular portions of a single 64×64 multiplier array.

It is apparent in both FIG. 8 and FIG. 9 that one-half of a 128-bit by 64-bit multiplier array is used by this instruction, and that by dividing the array into two 64-bit by 64-bit arrays in the center of the figures (as shown by dotted lines) and superimposing the two halves, that the portions of the half-arrays which are not used in the left half are not used in the right half, and the portions of the half-arrays which are used in the right half are not used in the left half. Thus this instruction can be implemented with a single 64-bit by 64-bit multiplier array with appropriately partitioned operands and accumulation arrays.

Figure 11:
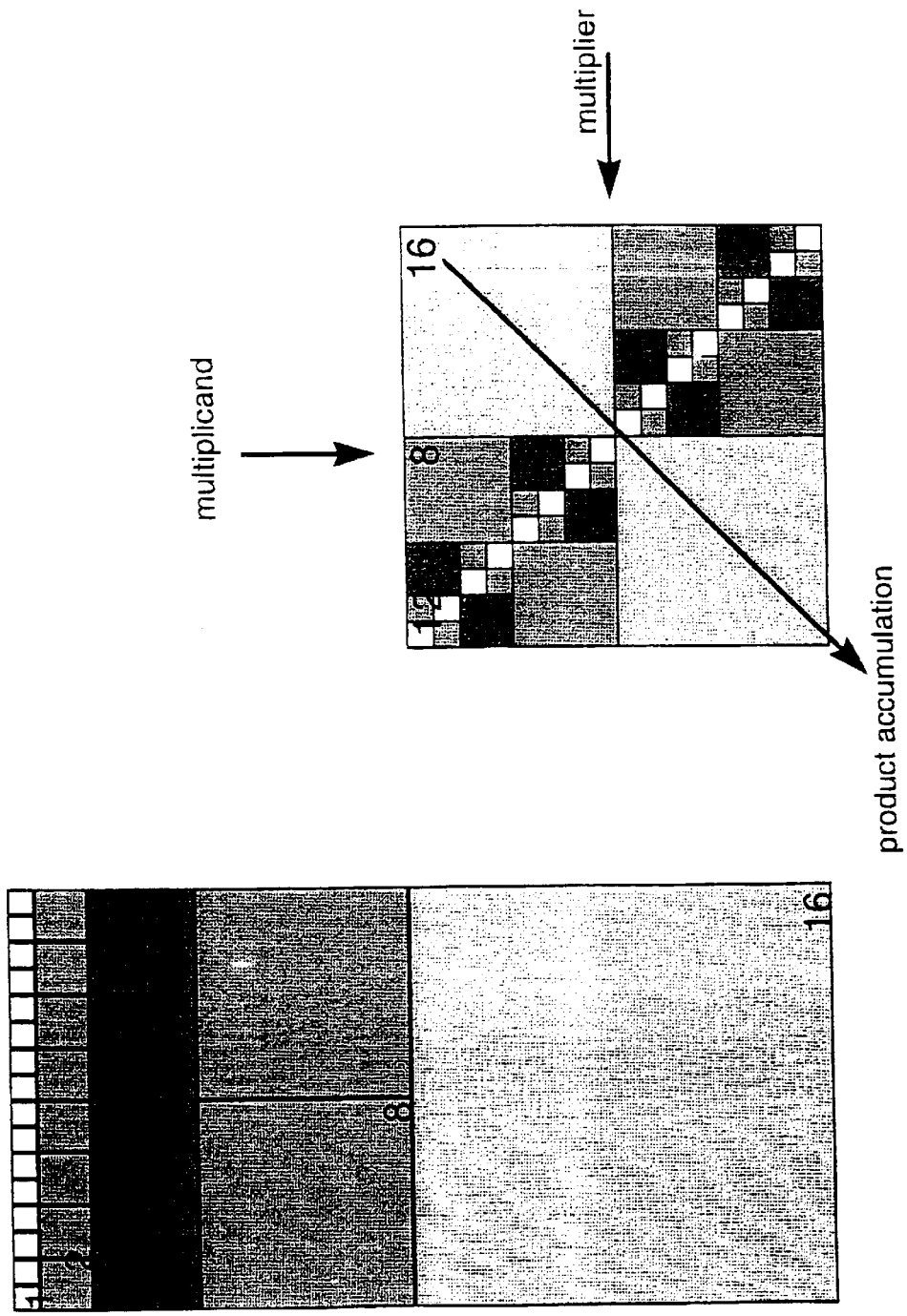
FIG. 11 illustrates how the instructions of FIGS. 1–4 can be produced from partitions of a single multi-precision multiplier array.

FIG. 11 shows how the multiplies required for group-multiply and group-multiply-and-add instructions can be produced from a single multi-precision structure. As shown, 1×1, 2×2, 4×4, 8×8, and 16×16 multiplies are illustrated; the preferred design extends up through 32×32 and 64×64 multiplies with the same structure or pattern. The smaller multipliers are formed from subsets of the larger multipliers by gating off (forcing to zero) portions of the multiplier and multiplicand array. The resulting products are added together in a classical carry-save multiplier-accumulation tree.

Figure 12:
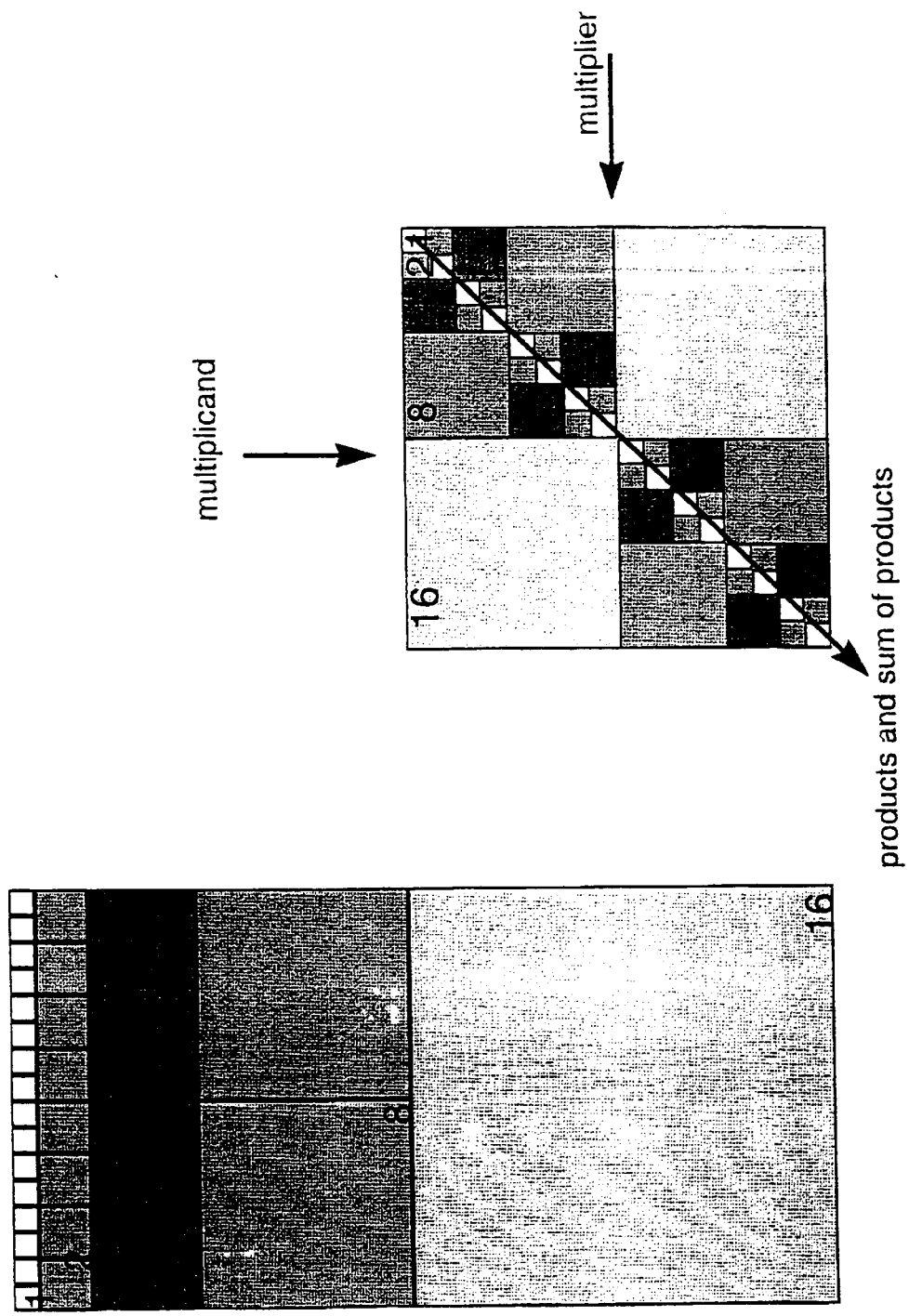
FIG. 12 illustrates how the instructions of FIGS. 5–6 can be produced from partitions of a single multi-precision multiplier array.

FIG. 12 shows how multiplies required for group-multiply-and-sum and group-multiply-and-sum-and-add instructions can be produced from a single multi-precision structure. As shown, 1×1, 2×2, 4×4, 8×8, and 16×16 multiplies are illustrated; the preferred design extends up through 32×32 and 64×64 multiplies with the same structure or pattern. In the same fashion as FIG. 11, the smaller multipliers are formed from subsets of the larger multipliers by gating off (forcing to zero) portions of the multiplier and multiplicand array. In this case, the gating is in the reverse of the pattern of FIG. 11, so that each of the products so formed are added together by the multiplier-accumulation tree.

FIGS. 7–10 also illustrate the product and accumulation patterns indicated for each of the two embodiments of group-convolve instructions, producing these operations from a single-multi-precision structure as previously detailed.

The following operational codes and psuedo-code of the foregoing instructions are intended to assist in the understanding thereof.

Group These instructions take two operands, perform a group of operations on partitions of bits in the operands, and catenate the results together.

Operation Codes

| | |
|---|---|
| G.CONVOLVE.1[1] | Group signed convolve bits |
| G.CONVOLVE.2 | Group signed convolve pecks |
| G.CONVOLVE.4 | Group signed convolve nibbles |
| G.CONVOLVE.8 | Group signed convolve bytes |
| G.CONVOLVE.16 | Group signed convolve doubles |
| G.CONVOLVE.32 | Group signed convolve quadlets |
| G.MUL.1[2] | Group signed multiply bits |
| G.MUL.2 | Group signed multiply pecks |
| G.MUL.4 | Group signed multiply nibbles |
| G.MUL.8 | Group signed multiply bytes |
| G.MUL.16 | Group signed multiply doublets |
| G.MUL.32 | Group signed multiply quadlets |
| G.MUL.64.[3] | Group signed multiply octlets |
| G.MUL.SUM.1[4] | Group signed multiply bits and sum |
| G.MUL.SUM.2 | Group signed multiply pecks and sum |
| G.MUL.SUM.4 | Group signed multiply nibbles and sum |
| G.MUL.SUM.8 | Group signed multiply bytes and sum |
| G.MUL.SUM.16 | Group signed multiply doublets and sum |
| G.MUL.SUM.32 | Group signed multiply quadlets and sum |
| G.MUL.SUM.64 | Group signed multiply octlets and sum |
| G.U.CONVOLVE.2 | Group unsigned convolve pecks |
| G.U.CONVOLVE.4 | Group unsigned convolve nibbles |
| G.U.CONVOLVE.8 | Qroup unsigned convolve bytes |
| G.U.CONVOLVE.16 | Group unsigned convolve doublets |
| G.U.CONVOLVE.32 | Group unsigned convolve quadlets |
| G.U.MUL.2 | Group unsigned multiply pecks |
| G.U.MUL.4 | Group unsigned multiply nibbles |
| G.U.MUL.8 | Group unsigned multiply bytes |
| G.U.MUL.16 | Group unsigned multiply doublets |
| G.U.MUL.32 | Group unsigned multiply quadlets |
| G.U.MUL.64[5] | Group unsigned multiply octlets. |
| G.U.MUL.SUM.2 | Group unsigned multiply pecks and sum |
| G.U.MUL.SUM.4 | Group unsigned multiply nibbles and sum |
| G.U.MUL.SUM.8 | Group unsigned multiply bytes and sum |
| G.U.MUL.SUM.16 | Group unsigned multiply doublets and sum |
| G.U.MUL.SUM.32 | Group unsigned multiply quadlets and sum |
| G.U.MUL.SUM.64 | Group unsigned multiply octlets and sum |

| class | op | | size |
|---|---|---|---|
| signed multiply | MUL CONVOLVE | MUL.SUM | 1 2 4 8 16 32 64 |
| unsigned multiply | U.MUL U.CONVOLVE | U.MUL.SUM | 2 4 8 16 32 64 |

[1] G.CONVOLVE.1 is used as the encoding for G.U.CONVOLVE.1.
[2] G.MUL.1 is used as the encoding for G.UMUL.1.
[3] G.MUL.64 is used as the encoding for G.CONVOLVE.64.
[4] G.MUL.SUM.1 is used as the encoding for G.UMUL.SUM.1.
[5] G.MUL.SUM.1 is used as the encoding for G.UMUL.SUM.1.

Format

G.op size rc = ra, rb

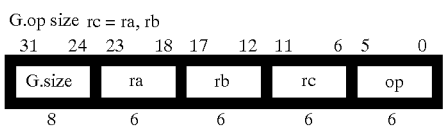

| 31 | 24 23 | 18 17 | 12 11 | 6 5 | 0 |
|---|---|---|---|---|---|
| G.size | ra | rb | rc | op | |
| 8 | 6 | 6 | 6 | 6 | |

Description

Two values are taken from the contents of registers or register pairs specified by ra and rb. The specified operation is performed, and the result is placed in the register or register pair specified by rc. A reserved instruction exception occurs for certain operations if $rc_0$ is set, and for certain operations if $ra_0$ or $rb_0$ is set.

Definition

```
def Group (op, size, ra, rb, rc)
    case op of
        G.MUL, G.U.MUL:
            a ← RegRead (ra, 64)
            b ← RegRead (rb, 64)
        G.MULSUM, G.U.MULSUM:
            a ← RegRead (ra, 128)
            b ← RegRead (rb, 128)
        G.CONVOLVE, G.U.CONVOLVE:
            a ← RegRead (ra, 128)
            b ← RegRead (rb, 64)
    end case
    case op of
        G.MUL:
            for i ← 0 to 64-size by size
```
$$c_{2*(i+size)-1..2*i} \leftarrow (a^{size}_{asize-1+i} \| a_{size-1+i..i}) *$$
$$(b^{size}_{asize-1+i} \| b_{size-1+i..i})$$
```
            end for
        G.U.MUL:
            for i ← 0 to 64-size by size
```
$$c_{2*(i+size)-1..2*i} \leftarrow (0^{size} \| a_{size-1+i..i}) *$$
$$(b^{size} \| b_{size-1+i..i}) * (0^{size} \| b_{size-1+i..i})$$
```
            end for
        G.MUL.SUM:
            csize ← (size ≤ 16) ? 64:128
            p[0] ← 0^csize
            for i ← 0 to 128-size by size
```
$$p(i+size) \leftarrow p[i] + (a^{size}_{asize-1+i} \| a_{size-size} \| a_{size-1+i..i}) *$$
$$(b^{csize-size}_{size-1+i} \| b_{size-1+i..i})$$
```
            end for
            c ← p[128]
        G.U.MUL.SUM:
            csize ← (size ≤ 16) ? 64:128
            p[0] ← 0^csize
            for i ← 0 to 128-size by size
```
$$p[i+size] \leftarrow p[i] + (0^{csize-size} \| a_{size-1+i..i}) *$$
$$(0^{csize-size} \| b_{size-1+i..i})$$
```
            end for
            c ← p[128]
        G.CONVOLVE:
            p[0] ← 0^128
            for j ← 0 to 64-size by size
                for i ← 0 to 64-size by size
```
$$p_{[j+size]2*(i+size)-1..2*i} \leftarrow p[j]_{2*(i+size)-1..2*i} +$$
$$(a^{size}_{asize-1+i+64-j} \| a_{size-1+i+64-j..i+64-j}) *$$
$$(b^{size-size}_{size-1+j} \| b_{size-1+j..j})$$
```
                end for
            end for
            c ← p[64]
        G.U.CONVOLVE:
            p[0] ← 0^128
            for j ← 0 to 64-size by size
                for i ← 0 to 64-size by size
```
$$p_{[j+size]2*(i+size)-1..2*i} \leftarrow p[j]_{2*(i+size)-1..2*i} +$$
$$(0^{size} \| a_{size-1+i+64-j..i+64-j}) *$$
$$(0^{size} \| b_{size-1+j..j})$$
```
                end for
            end for
            c ← p[64]
    end case
    case op of
        G.MUL, G.UMUL, G.CONVOLVE, G.U.CONVOLVE:
            RegWrite (rc, 128, c)
        G.MUL.SUM, G.U.MUL.SUM:
            RegWrite (rc, csize, c)
    end case
end def
```

As stated above, the present invention provides important advantages over the prior art. Most importantly, the present invention optimizes both system performance and overall power efficiency, thereby overcoming significant disadvantages suffered by prior art devices as detailed above.

Thus, a multiplier array processing system is described. Although the elements of the present invention have been described in conjunction with a certain embodiment, it is appreciated that the invention may be implemented in a variety of other ways. Consequently, it is to be understood that the particular embodiment shown and described by way of illustration are in no way intended to be considered limiting. Reference to the details of these embodiments is not intended to limit the scope of the claims which themselves recite only those features regarded as essential to the invention.

We claim:

1. A multiplier processing system for performing a group-multiply-and-sum instruction, said system comprising:

means for partitioning each of a plurality of operands into a plurality of symbols, said operands having a first defined bit width and said symbols having a a second defined bit width, said second defined bit width of said symbols being dynamically variable;

means for multiplying symbols of a first operand with symbols of a second operand, each of such multiplications producing a product; and means for adding each product so as to produce a single scalar result, said scalar result capable of being represented by a bit width which is equal to or less than said first defined bit width of said operands without a reduction in the accuracy of said result.

2. The multiplier processing system for performing a group-multiply-and-sum instruction according to claim 1, wherein the instruction comprises a fixed-point arithmetic operation.

3. The multiplier processing system for performing a group-multiply-and-sum instruction according to claim 1, wherein the instruction comprises a floating-point arithmetic operation.

4. The multiplier processing system for performing a group-multiply-and-sum instruction according to claim 1, further comprising:

means for including a third operand in the addition of said products.

5. A multiplier processing system for performing a group-multiply-sum-and-add instruction, said system comprising:

means for partitioning each of a plurality of operands into a plurality of symbols, said operands having a first defined bit width and said symbols having a second defined bit width, said second defined bit width of said symbols being dynamically variable;

means for multiplying symbols of a first operand with symbols of a second operand, each of such multiplications producing a product; and means for adding each product and a third operand so as to produce a single scalar result, said scalar result capable of being represented by a bit width which is equal to or less than said first defined bit width of said operands without a reduction in the accuracy of said result.

6. The multiplier processing system for performing a group-multiply-sum-and-add instruction according to claim 5, wherein the instruction comprises a fixed-point arithmetic operation.

7. The multiplier processing system for performing a group-multiply-sum-and-add instruction according to claim 5, wherein the instruction comprises a floating-point arithmetic operation.

* * * * *

UNITED STATES PATENT AND TRADEMARK OFFICE
CERTIFICATE OF CORRECTION

PATENT NO. : 5,953,241　　　　　　　　　　　　　　　　　　　　Page 1 of 1
DATED : September 14, 1999
INVENTOR(S) : Hansen et al.

It is certified that error appears in the above-identified patent and that said Letters Patent is hereby corrected as shown below:

<u>Title Page:</u>
In the Assignee section, change "Microunity Engineering Systems, Inc." to
--MicroUnity Systems Engineering, Inc.--

Signed and Sealed this

Fourteenth Day of August, 2001

Attest:

NICHOLAS P. GODICI
Attesting Officer　　　　Acting Director of the United States Patent and Trademark Office

UNITED STATES PATENT AND TRADEMARK OFFICE
CERTIFICATE OF CORRECTION

PATENT NO. : 5,953,241 Page 1 of 1
DATED : September 14, 1999
INVENTOR(S) : Craig C. Hansen et al.

It is certified that error appears in the above-identified patent and that said Letters Patent is hereby corrected as shown below:

Column 1,
Line 7, change "is a continuation of" to -- application claims the benefit of priority to --
Line 10, replace "which" with -- and --

Signed and Sealed this

Twenty-seventh Day of January, 2004

JON W. DUDAS
*Acting Director of the United States Patent and Trademark Office*